W. W. HENDERSON.
TRANSMISSION GEARING.
APPLICATION FILED NOV. 12, 1909.
956,089.
Patented Apr. 26, 1910.
5 SHEETS—SHEET 2.
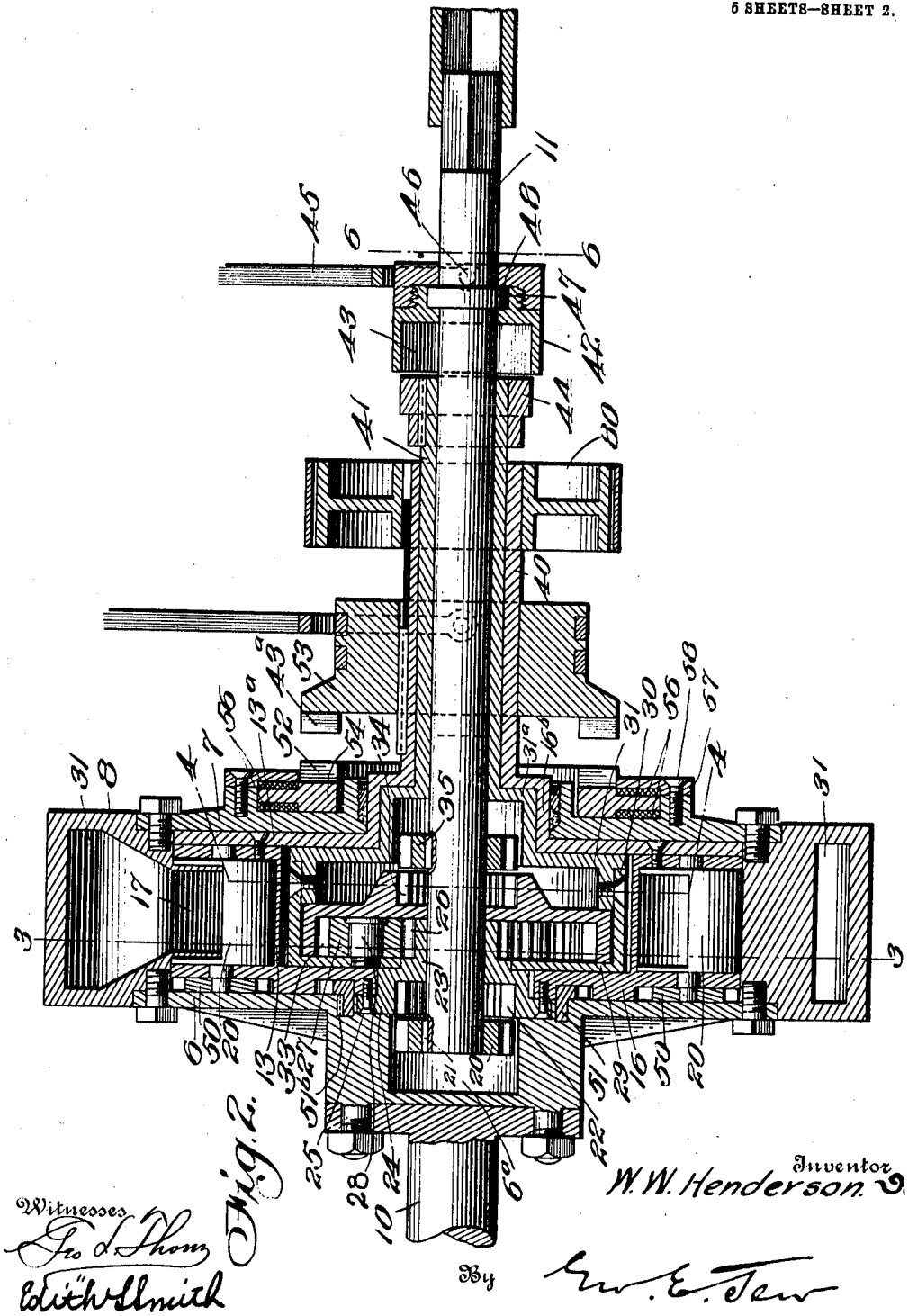
Witnesses
Inventor
W. W. Henderson.
By
Attorney

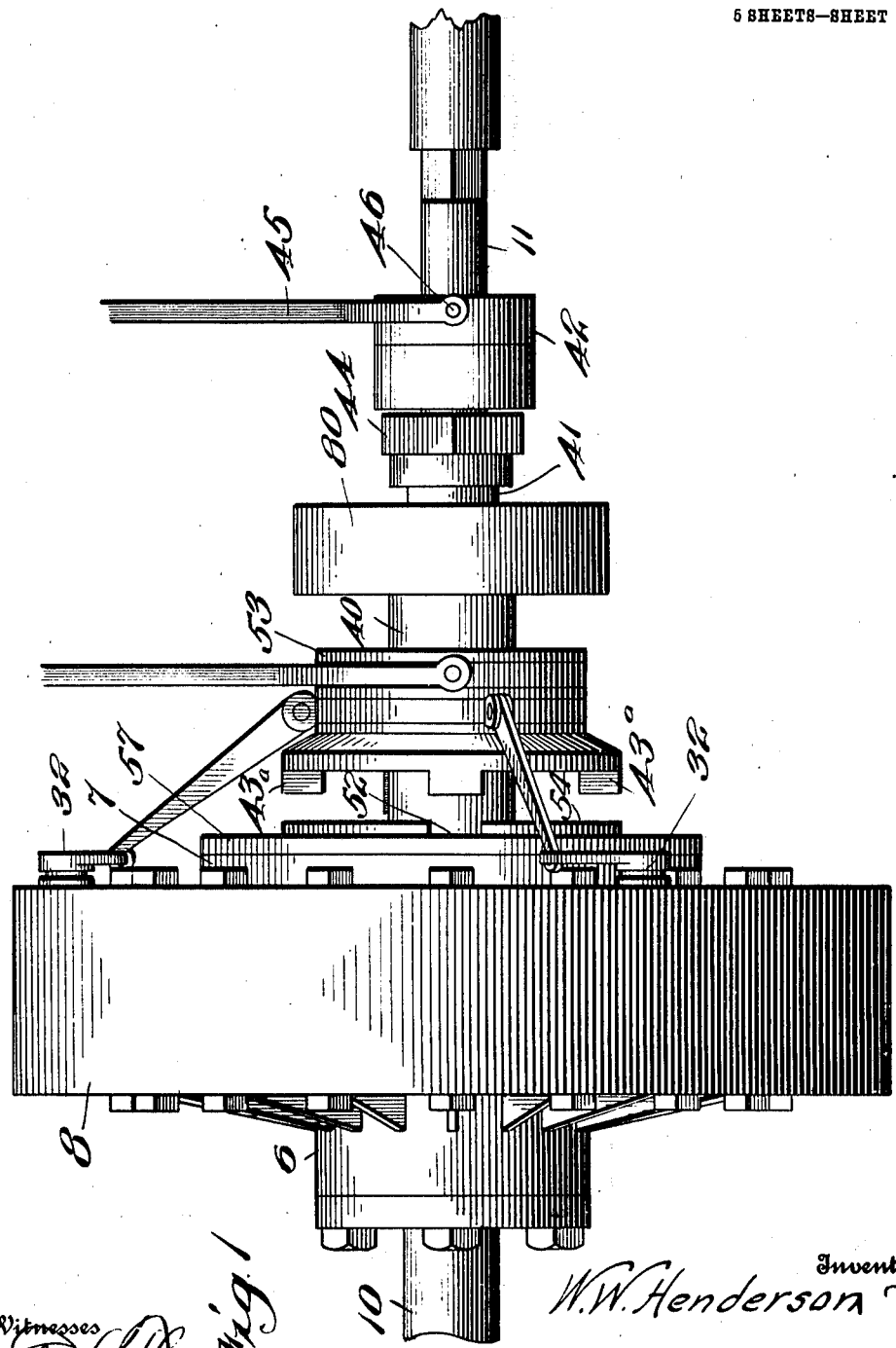

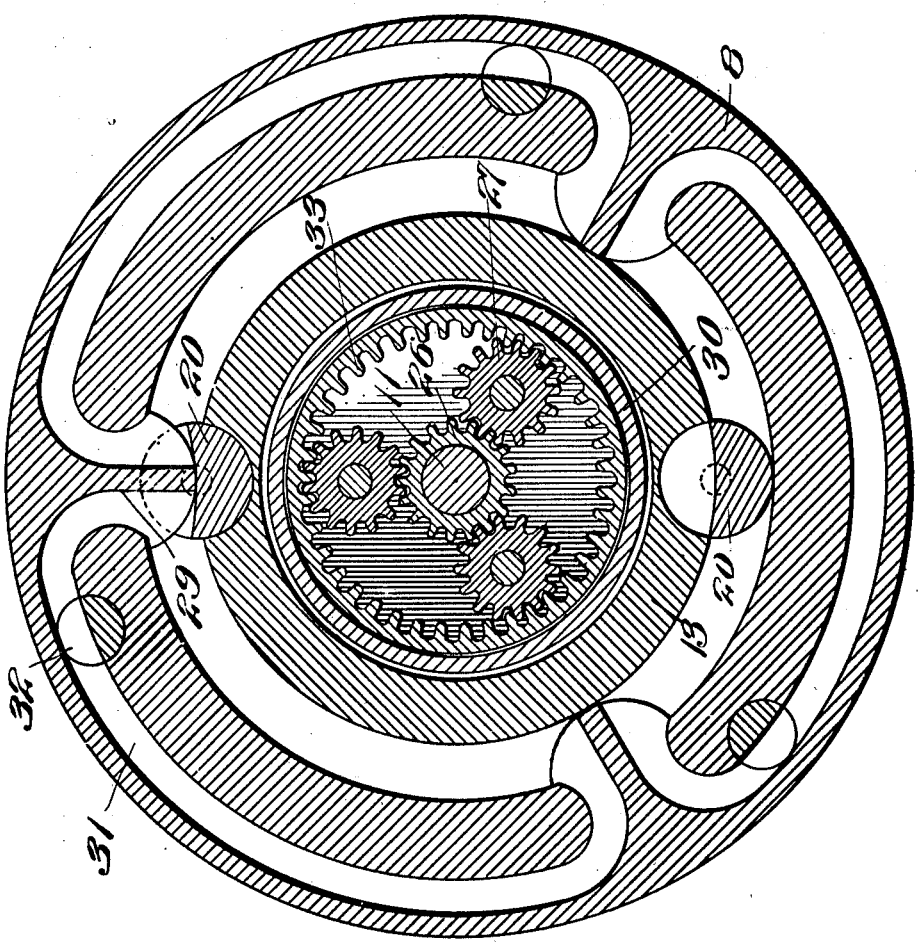

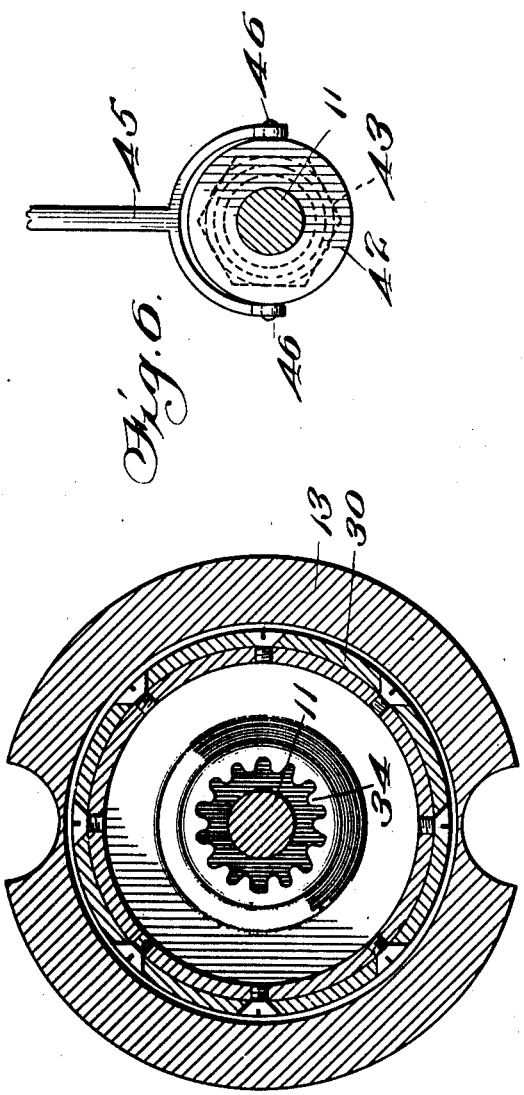

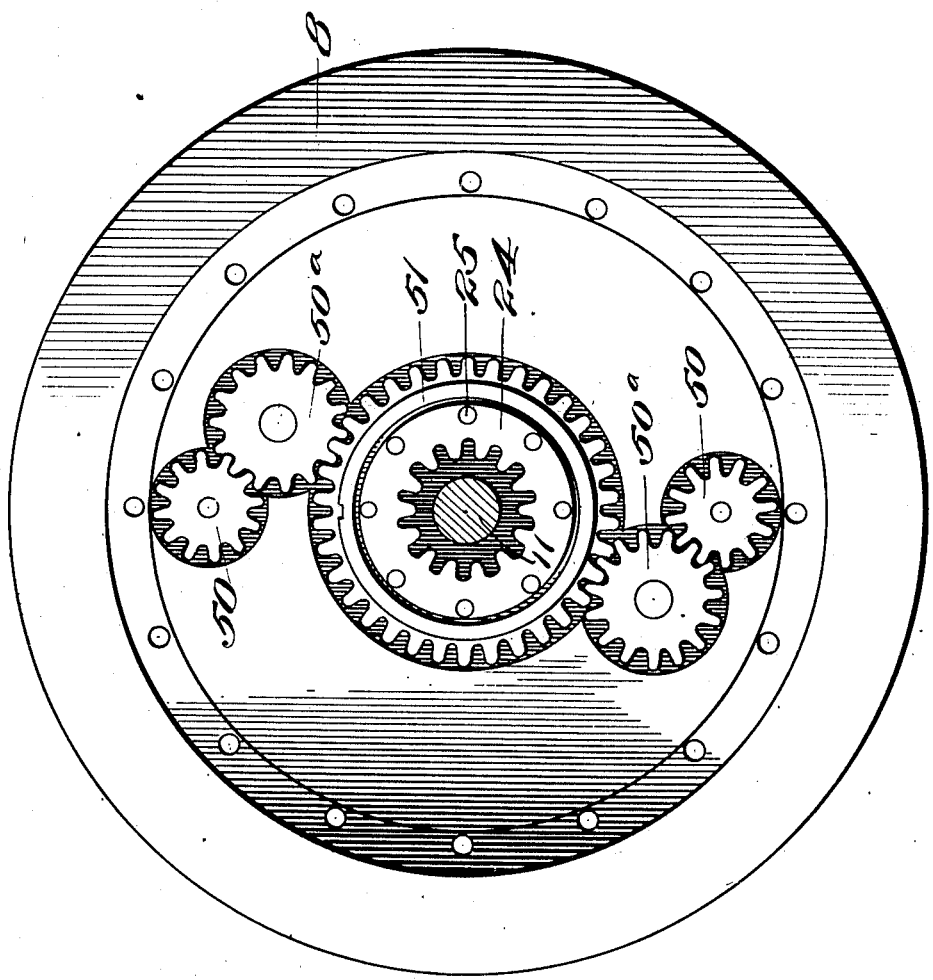

UNITED STATES PATENT OFFICE.

WILLIAM W. HENDERSON, OF WASHINGTON, DISTRICT OF COLUMBIA.

TRANSMISSION-GEARING.

956,089.  Specification of Letters Patent.  Patented Apr. 26, 1910.

Application filed November 12, 1909. Serial No. 527,739.

*To all whom it may concern:*

Be it known that I, WILLIAM W. HENDERSON, a citizen of the United States, residing at Washington, in the District of Columbia, have invented certain new and useful Improvements in Transmission - Gearing, of which the following is a specification.

This invention relates to transmission gearing, and comprises a direct and reverse drive gearing operating in connection with a hydraulic clutch such for example as that shown and described in my U. S. Patent No. 879045, dated Feb. 11, 1908.

The invention forming the subject of the present application is a modification of and improvement on the gearing described and claimed in my pending application No. 474260, filed Jan. 26, 1909.

The present invention has for its object to provide an improved construction in which the transmission gearing is located in the same casing as the clutch, avoiding the necessity for an intermediate shaft and connections, the clutch casing also acting as a fly wheel, and the whole device providing an improved direct connection between the engine shaft and the driven shaft.

The invention is capable of general application, but is intended especially for use in connection with motor vehicles. The change speed gear described in the pending application above mentioned is omitted, the present device providing gearing for only one speed on the forward drive and one on the reverse, the speed being variable by means of the hydraulic clutch as more fully explained in the patent above referred to.

The invention is illustrated in the accompanying drawings in which—

Figure 1 is a side elevation of the clutch and gearing. Fig. 2 is a longitudinal section in the axis of the shaft. Fig. 3 is a section on the line 3—3 of Fig. 2. Fig. 4 is a section on the line 4—4 of Fig. 2. Fig. 5 is an interior end elevation, the back plate of the clutch casing being removed. Fig. 6 is a section on the line 6—6 of Fig. 2.

Except for modifications hereinafter mentioned, the clutch is the same as that shown in my patent above mentioned, and will be briefly described: 6 indicates the back plate of the clutch casing and 7 the front plate. A weighted rim 8 is bolted between the plates and acts as a fly wheel. The engine or driving shaft 10 is bolted to the back of the hub of the plate 6, and thus the casing and fly wheel are driven with said shaft. The driven shaft is indicated at 11, and projects through the front plate of the casing, terminating in a circular recess 6ª formed in the hub of the back plate. Fitting within the casing and against the back plate 6 is a circular plate 16 made integral with a hollow block or wall 13 which forms the inner wall of the annular fluid chamber 17, the outer wall of which is formed by the rim 8. At its front or free end the wall 13 is bolted or otherwise secured to an annular face plate 13ª which is preferably made integral with a box 16ᵇ surrounding the shaft 11, said box being formed at the rear or inner end of a sleeve 40 to be hereinafter more particularly described and which projects through the front plate of the clutch casing. Within the fluid chamber are roller pistons 20, as described in my said patent. The chamber 17 is divided by partitions 29 into several compartments the ends of which are connected by by-passes 31 controlled by valves 32, also in the manner described in said patent. Instead of the internal ring gear for driving the roller pistons, as shown in my said patent, the present structure has a gear 50 on one trunnion of each piston, driven by a spur gear 51 through an intermediate gear 50ª, said gears being set in suitable recesses in the back of the plate 16. The annular spur gear 51 is keyed to the back plate 6 of the casing by key 51ᵇ. When the inner and outer parts of the clutch rotate with respect to each other, the pistons are turned to pass the abutments 29, as described in my said patent. The valves 32 controlling the relative movement of the parts may be operated by the means shown in said patent, and also shown herein, or by any other suitable means.

The operation of the clutch thus described may be briefly stated as follows: The outer clutch casing rotates with the shaft section 10, and when the valves 32 are open as shown in Fig. 5 the gears 50 and 50ª cause the pistons 20 to roll around in the chamber 17, and by their movement force the fluid around through the passages 31 without movement of the driven parts. By closing the valves more or less the passage of the fluid will be obstructed to a greater or less extent, and consequently the motion will be transmitted at corresponding speed to the circular plate 16 and thence to the shaft 11 as hereinafter described.

The walls 13, 13ª and the box 16ᵇ produce an internal chamber within the clutch which contains the reverse gearing to be described.

As stated, the hub of the back plate 6 is recessed as indicated at 6ª, and the end of the driven shaft 11 projects into this recess and is provided therein with a clutch member, consisting conveniently of a pinion 20 keyed on the end of the shaft as indicated at 21, and this clutch member is arranged to be engaged or disengaged with a corresponding clutch member consisting of an internal gear 22 formed in one end of an annular casing 23 which has a projecting flange 24 fixed to the plate 16 of the clutch as by screws 25, this member being loose on the shaft 11. I use a pinion 20 and gear 22 to form a clutch simply for the purpose of convenience. It will be seen that when the shaft 11 is moved forwardly to engage the clutch members 20 and 22 the shaft will be directly driven from the main clutch member 16, the speed of which may be varied as described in my said patent. This gives the direct or forward drive from the driven member 16 of the clutch to the driven shaft 11. When the shaft is shifted inwardly to disengage the parts 20 and 22 the drive is accordingly stopped. For the reverse, the front end of the member 23 is provided with an external gear 26 which meshes with pinions 27 carried on studs 28 fixed to the inwardly projecting flange 29 of a box formed by said flange, the outer circular wall 30 and a front plate 31. This box contains a gear member which has on one side an internal gear 33 which meshes with the pinions 27, and on the other side an internal clutch gear 34 which is arranged to mesh with a clutch pinion 35 keyed on the shaft 11 as shown. The member 35 is thrown in mesh with the member 34 by shifting the shaft inwardly to a full extent, and it may be stated that the pinions 20 and 35 are so located on the shaft 11 that when the shaft is shifted to neutral or middle position both of said pinions will be disengaged, as shown in Fig. 2. The front plate 31 of the reverse gear casing is boxed out as indicated at 31ª, to form a space for the movement of the pinion 35 when the shaft 11 is shifted, said box fitting within the box 16ᵇ above described, and, furthermore, the box 31ª is extended to form a sleeve 41 between the shaft and the sleeve 40, projecting, however, beyond the front end of the latter.

The operation of the reverse drive is as follows: The shaft 11 is shifted inwardly to engage the pinion 35 and gear 34 and disengage the direct drive pinion 20. The motion of the driven element 16 of the main clutch is then transmitted through the sleeve 23, gear 26, pinions 27, gear 33 and clutch members 34 and 35 to the shaft 11. During this action it is necessary to hold the gear casing 31 against revolution and for this purpose I provide a cuff 42 having a non-circular recess 43 in its inner end arranged to fit over the non-circular end 44 of the sleeve 41. The cuff 42 is shifted into and out of engagement by means of a lever 45 having pins 46 projecting into said cuff and preventing rotation thereof. The same lever serves to shift the shaft in or out, for which purpose the shaft has a collar 47 fixed thereon to run in an internal groove 48 made in the cuff. It will be seen that when the cuff is shifted to engage the same with the sleeve 41 the shaft will also be shifted inwardly to engage the part 35 and disengage the part 20. The drive may thus be changed from direct to reverse by movement of a single lever, the speed in either condition being varied by manipulation of the hydraulic clutch valves as above described and as more fully explained in my said patent.

In addition to the parts above described I retain certain features shown in said patent and pending application. Thus the sleeve 40, connected to the driven part of the main clutch, may be provided with a wheel 80 to receive a band brake for braking the drive. I also show the positive clutch feature of the former patent, said clutch being operative when the fluid clutch is fully engaged, a cuff 53 on the sleeve 40 being shifted by a suitable lever and collar connection and having projections 43ª which enter notches 52 in a ring 54 which is frictionally engaged between packing 56 clamped to the front plate 7 of the clutch casing by a ring 57 and screws 58 with pressure sufficient to transmit positively any ordinary strain, but allowing slip under excessive conditions, said collar 53 being keyed on the sleeve 40; and when the collar is shifted to the full extent a positive clutch is completed between the clutch casing and the sleeve, and from the sleeve the motion is transmitted through the plate 13ª, block 13, plate 16 clutch members 22 and 20 to the driven shaft 11, thus giving a direct drive between the clutch casing 6, 7, 8 and the shaft instead of through the fluid clutch above referred to.

What I claim as new is:—

1. The combination of a rotary driving member, a driven shaft on which said member is loosely mounted and around which said member rotates, a reversing gearing between the shaft and the said member, a clutch device for direct drive between said member and the shaft and located on one side of said member, a clutch device for reverse drive between said gearing and the shaft, and located on the opposite side of said member, and means to shift the shaft lengthwise to engage one of said clutch devices and disengage the other.

2. The combination of a rotary driving member, a driven shaft on which said member is loosely mounted and around which said member rotates, a reversing gearing between the shaft and the said member on one side of said member, a clutch device for direct drive between said member and the shaft on the opposite side of said member, a clutch device for reverse drive between said gearing and the shaft, said shaft being shiftable lengthwise to engage one of said clutch devices or disengage both, and means to so shift the shaft, for the purpose stated.

3. The combination of a main clutch having rotary driving and driven members, a shaft around which the driven member rotates, said shaft being shiftable lengthwise, a clutch device for direct drive between the said driven member and the shaft, a reverse gearing and clutch device for reverse drive between said driven member and shaft, and means to shift the shaft lengthwise to engage one of said clutch devices and disengage the other.

4. The combination of a rotary driving member, a driven shaft, said shaft being shiftable axially in the axis of said member, a clutch device for direct drive between the said member and shaft, a planetary reversing gearing revoluble around the shaft and operatively connected to the said member, a clutch device for reverse drive between said shaft and gearing, and means to shift the shaft to engage one of said clutch devices and disengage the other.

5. The combination of a rotary driving member, a driven shaft, said shaft being shiftable axially in the axis of said member, a clutch device for direct drive between the said member and shaft, a planetary reversing gearing revoluble around the shaft and operatively connected to the said member, said gearing including a gear casing having a sleeve extending along the shaft, a clutch device for reverse drive between said shaft and gearing, means to shift the shaft to engage one of said clutch devices and disengage the other, and means engageable with said sleeve to hold said casing against rotation when the reverse clutch device is engaged.

6. The combination of a rotary driving member, a driven shaft shiftable axially in the axis of said member, a direct drive clutch device between said member and shaft, one part of the clutch being fastened to the said member and the other part to the shaft, the former part having a gear thereon, a planetary reverse gearing revoluble around said shaft and including a gear which meshes with said gear, a reverse drive clutch device one part of which is carried by said planetary gearing and the other part of which is fastened to the shaft, means to shift the shaft to engage one of said clutch devices and disengage the other, and means to hold the planetary gearing against revolution when the reverse drive clutch device is in engagement.

7. The combination of a rotary driving member, a driven shaft shiftable axially in the axis of said member, a clutch device for direct drive between said member and shaft, a planetary reversing gearing revoluble around the shaft and geared to said member, a gear casing carrying said gearing, a clutch device for reverse drive between said shaft and gearing, means to shift the shaft to engage one of said clutch devices and disengage the other, and means operating automatically to hold said casing against rotation when the reverse clutch device is engaged.

8. The combination of a driven shaft shiftable lengthwise, a rotary driving member forming an inclosing casing around said shaft, direct drive mechanism in the casing, and engageable with the shaft and said member when the shaft is shifted in one direction, reverse drive mechanism mounted on the shaft and in the casing and engageable with the shaft and said member when the shaft is shifted in the opposite direction, and means to shift the shaft, for the purposes stated.

9. The combination of a driven shaft shiftable lengthwise, a rotary driving member having a sleeve bearing on the shaft, said sleeve provided with one member of a clutch device and a gear, the other member of the clutch device being fast on the shaft, a planetary gearing and its casing revoluble around the shaft and meshing with said gear and having one member of a reverse drive clutch device, the other member thereof being fast on the shaft, means to shift the shaft to engage one clutch device and disengage the other, and means to hold the planetary gearing casing against revolution when the reverse drive clutch device is engaged.

In testimony whereof, I affix my signature in presence of two witnesses.

WILLIAM W. HENDERSON.

Witnesses:
   EDITH L. SMITH,
   GEO. E. TEW.